Jan. 15, 1935.  G. A. EBERHARDT  1,987,772
ELECTRIC SOCKET PLUG
Filed Jan. 3, 1933
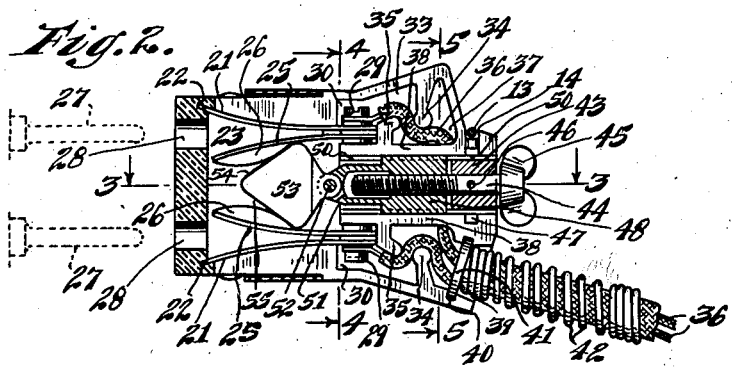
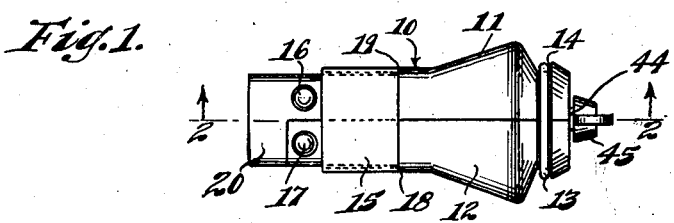
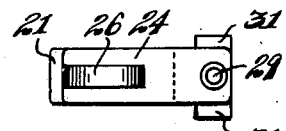
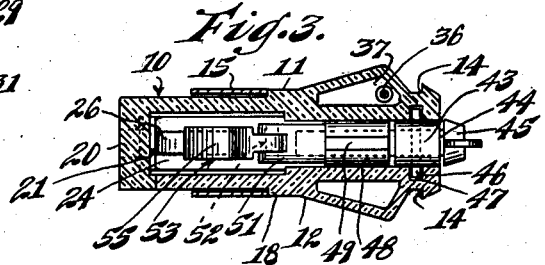
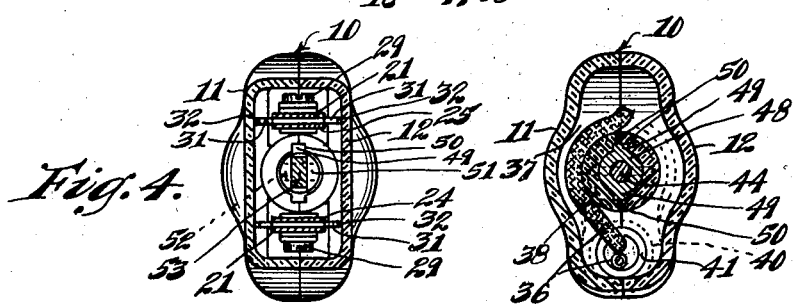
Witnesses:
E. E. Wessels
Aasta E. Matsen
Inventor:
Gustav A. Eberhardt,
By Joshua R. H. Potts
his Attorney.

Patented Jan. 15, 1935

1,987,772

UNITED STATES PATENT OFFICE 1,987,772

ELECTRIC SOCKET PLUG

Gustav A. Eberhardt, Oak Park, Ill.

Application January 3, 1933, Serial No. 649,930

3 Claims. (Cl. 173—332)

My invention relates to improvements in electric socket plugs, and has for an object the provision of a device which is economical to manufacture and yet which, because of its construction, will insure a much superior electrical circuit and thus conserve electricity, render better service and longer service, and be particularly durable.

Another object is the provision of a device which may be used with different sized and shaped contact members and yet provide a good circuit.

Another object is the provision of a device which may be readily taken apart for adjustment, replacement of parts or any other purpose of like character.

Another object is the provision of such a device which may be adjusted from its exterior and be caused to grip more tightly its counterpart contact members.

My invention may be best understood by reference to the accompanying drawing in which the preferred form of my invention is illustrated, and in which Fig. 1 is a side elevational view of my device;

Fig. 2 is a sectional view taken substantially on the line 2—2 of Fig. 1;

Fig. 3 is a sectional view taken substantially on the line 3—3 of Fig. 2;

Fig. 4 is a sectional view taken substantially on the line 4—4 of Fig. 2;

Fig. 5 is a sectional view taken substantially on the line 5—5 of Fig. 2; and

Fig. 6 is a detail view showing one of my contact members and the device used in anchoring the same.

As can be seen in Fig. 1, my device comprises a plug 10 having casing members 11 and 12 partly secured together by a ring 13 seating in groove 14, and further held together by clamping band 15. Seating between bosses 16 and 17 and shoulders 18 and 19 a casing member 11 is provided with a projecting lug 20 which extends across the entire width of the casing, and it can thus be seen that member 12 is considerably shorter than member 11.

Interiorly of my device are provided spring contact members 21 seating in pockets 22 provided in the interior portion of the lower end of member 11. Between oppositely disposed contact members 21 are provided recesses 23 and 24 in members 11 and 12, respectively. In said recesses 23 and 24 are placed contact members 25 having cam portions 26. Contact members 27 are adapted to be inserted through bores 28 and be clampingly engaged by the interior contact members 21 and 25. Binding bolts 29 secure the interior contact members together and seat in recesses 30 which are of appropriate size and shape to afford a top abutting wall for said contact members. Between each pair of contact members is inserted an anchoring plate 31 adapted to seat in recesses 32 for the purpose of further securing said contact members in proper position.

Above binding bolts 30 are provided recesses 33, and they are bounded by partition walls 34 and 35 having space therebetween for the passage of wires 36. As can be seen in Figs. 2, 3, and 4, one of said wires 36 after leaving recess 33 passes through recess 37 in casing member 11, and crosses from one side of the device under cylindrical partition member 38 and both wires then find their exit through passage 39 which is provided interiorly thereof with a groove 40 adapted to receive an insulating collar 41 having secured thereto a spring sheathing 42 which embraces wires 36.

Interiorly of cylindrical partition 38 is arranged a cylindrical plug 43 receiving centrally thereof a threaded bolt member 44 having a wing nut head 45. Pin 46 passes through plug 43 and bolt 44 and extends on each side of said plug into groove 47. Adjacent the bottom of plug 43, and separated therefrom by a small amount of space, may be arranged a cylindrical block 48 provided with longitudinally extending beads or keys 49 which in turn seat in and are arranged for sliding motion in longitudinal grooves 50. To the lower portion of block 48 are secured depending bifurcated portions 51 which meet and receive pin 52 which pivotally secures wedge member 53 to the lower portion of block 48. Centrally of block 48 and extending longitudinally thereof is a threaded bore for the reception of the threaded end of bolt 44. Wedge member 53 is preferably made of nonconducting material such as hard rubber or composition of similar characteristics, and is provided with angular side faces 54 and 55 which extend downwardly and between cam members 26 on contact members 25.

In operation it can be seen that contact members 21 and 25 may be caused to embrace more tightly contact members 27 by turning wing nut head 45 which is exterior of the device and secured to bolt 44 which is keyed to plug 43 by pin 46 which bears in groove 47. Since bolt 44 threadedly engages block 48, it causes the downward movement of wedge member 53 whose side surfaces 54 and 55 impinge on cam members 26 secured to contact members 25 and cause said members to move toward members 21 and engage contact members 27 more tightly. Because of the pivotal connection of wedge member 53 to the lower ends of block 48, it can be seen that the wedge is free to move laterally of the device and thus compensate for a condition in which one of said contact members 27 is securely held while the other is only loosely held. When it is desired to remove the plug from the contact members 27, wing nut 45 may be turned in the reverse direction and thus raise wedge member 53, and contact members 25, because of their resilient nature, will tend to return to their normal positions as shown in Fig. 2.

The two members 11 and 12 may be removed one from the other by the removal of clamping ring 14 which is split, and the removal of clamping band 15 which is also split and will slide downwardly over bosses 16 and 17.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A device of the character described, comprising a casing, a pair of movable contact members within said casing and lying in substantially the same plane, cam surfaces on said contact members, a wedge cam member disposed between said movable contact members, and operable connections for causing said wedge cam member to operate on said cam surfaces to separate said movable contact members and press them against the prongs of a cooperating contact member.

2. A device of the character described, comprising a casing, a pair of movable contact members within said casing and lying in substantially the same plane, cam surfaces on said contact members, a pivotally mounted wedge cam member disposed between said movable contact members, and operable connections for causing said wedge cam member to operate on said cam surfaces to separate said movable contact members and press them against the prongs of a cooperating contact member.

3. A device of the character described comprising a casing, two pairs of contact members within said casing, one of each of said pairs of contact members being movable toward the other of its pair so as to grip a prong contact member between each pair of contact members, a movable member separating said movable contact members and adapted when moved to move said movable contact members a greater distance apart and press each of said movable contact members toward the other of its pair, a manually operable member exteriorly of said casing, and operative connections between said manually operable member and said movable member.

GUSTAV A. EBERHARDT.